(12) United States Patent
Saito

(10) Patent No.: US 7,799,297 B2
(45) Date of Patent: Sep. 21, 2010

(54) DEVICE AND METHOD FOR PROCESSING COMBUSTION EXHAUST GAS

(75) Inventor: Shinichiro Saito, Kumagaya (JP)

(73) Assignee: Taiheiyo Cement Corporation

( * ) Notice: Subject to any disclaimer, the term of this patent is extended or adjusted under 35 U.S.C. 154(b) by 963 days.

(21) Appl. No.: 10/561,479

(22) PCT Filed: Jun. 28, 2004

(86) PCT No.: PCT/JP2004/009097

§ 371 (c)(1),
(2), (4) Date: Dec. 1, 2006

(87) PCT Pub. No.: WO2005/005025

PCT Pub. Date: Jan. 20, 2005

(65) Prior Publication Data

US 2007/0086930 A1    Apr. 19, 2007

(30) Foreign Application Priority Data

Jul. 10, 2003   (JP)   ............... 2003-272896

(51) Int. Cl.
*B01D 53/56* (2006.01)
*B01D 53/72* (2006.01)
*B01D 53/74* (2006.01)

(52) U.S. Cl. ............. 423/210; 423/235; 423/239.1; 423/243.01; 423/215.5; 423/245.1; 422/168; 422/169; 422/170; 422/171; 422/172; 422/177

(58) Field of Classification Search ............... 423/210, 423/235, 239.1, 243.01, 215.5, 245.1; 422/168–172, 422/177

See application file for complete search history.

(56) References Cited

U.S. PATENT DOCUMENTS 4,026,992 A * 5/1977 Shiga et al. ............... 423/239.1

FOREIGN PATENT DOCUMENTS

EP    0559071    2/1993
EP    0787521    6/1997

(Continued)

OTHER PUBLICATIONS

Nishitani, Takashi, "A Basic Experiment on the Mercury Removal in Exhaust Gases from Municipal Refuse Incinerator," Osaka City Institute of Public Health and Environmental Sciences, Annual Report No. 51, 1988.

*Primary Examiner*—Timothy C Vanoy
(74) *Attorney, Agent, or Firm*—Stetina Brunda Garred & Brucker

(57) ABSTRACT

This combustion exhaust gas processing device comprises a dust collector collecting dust in combustion exhaust gas, a wet dust collector collecting water soluble components and dust in the combustion exhaust gas passed through the dust collector, and a catalyst tower decomposing and removing NOx and/or dioxins in the combustion exhaust gas passed through the wet dust collector. The device also comprises a reheater heating the combustion exhaust gas discharged from the wet dust collector at the front stage of the catalyst tower, an oxidizer adding device adding an oxidizer to the combustion exhaust gas passed through the dust collector, a solid/liquid separator separating slurry discharged from the wet dust collector into solid and liquid phases, a mercury adsorbing tower adsorbing mercury in liquid separated in the solid/liquid separator, and a heat recovering device heating the combustion exhaust gas discharged from the catalyst tower at the rear stage thereof.

13 Claims, 3 Drawing Sheets

FOREIGN PATENT DOCUMENTS

| | | |
|---|---|---|
| EP | 0860197 | 8/1998 |
| JP | 775720 | 3/1995 |
| JP | 7204604 | 8/1995 |
| JP | 10230137 | 9/1998 |
| JP | 11244826 | 9/1999 |
| JP | 11347548 | 12/1999 |
| JP | 2002180146 | 6/2002 |
| JP | 2002355531 | 12/2002 |
| JP | 2004-66229 | 3/2004 |
| JP | 2004-313833 | 11/2004 |

* cited by examiner

DEVICE AND METHOD FOR PROCESSING COMBUSTION EXHAUST GAS

TECHNICAL FIELD

The present invention relates to a device and a method for processing combustion exhaust gas, and more particularly to a device and a method for processing combustion exhaust gas to remove harmful substances such as dust, NOx and dioxins in combustion exhaust gas from combustion furnaces including cement kilns.

BACKGROUND ART

In combustion exhaust gas from incinerators for city garbage, besides SOx, NOx and the like, a small amount of virulently poisonous dioxins is contained, and variety of technologies has been proposed to remove dioxins.

For instance, in the first patent document, a technology for removing dust, SOx, NOx, dioxins and the like contained in gas exhausted from incinerators is disclosed. In this technology, after feeding the gas from incinerators to the first heat exchanger to recover heat, dust is collected through a cyclone and an electric precipitator; SOx and NOx are removed through a scrubber; the exhaust gas is heated by the secondary heat exchanger up to 100 to 200; further harmful components are adsorbed by activated carbon powder added; and a bag filter collects the activated carbon powder filtered.

Further, the second patent document discloses an exhaust gas processing device using adsorber such as activated carbon for removing harmful substances such as dust, dioxins and halogenation organic compound including PCBs. The device comprises: an electric precipitator for removing dust such as ash mixed in exhaust gas from an exhaust gas source to effectively use the adsorber even when the concentration of the dust in the exhaust gas is high; an adsorber adding device for adding adsorber such as activated carbon to the exhaust gas of which dust are removed through the electric precipitator; and a bag filter, through which the exhaust gas with the adsorber passes, to filter the adsorber in the exhaust gas.

Besides the above methods of adsorption with activated carbon or the like, the third and fourth patent documents disclose exhaust gas processing devices that soak water with ozone, and spray the ozone-contained water in granular state, through nozzles disposed in a cooling tube, to the exhaust gas flowing in the cooling tube.

Further, the fifth patent document proposes an exhaust gas processing method to remove NOx and dioxins in exhaust gas generated by incinerators for city garbage or the like. The method comprises the steps of: cooling the exhaust gas; introducing the cooled exhaust gas to a bag filter to collect dust including dioxins in solid state; heating the gas again; and contacting the exhaust gas together with a reducing agent for denitration including ammonia to a honeycomb-shaped catalyst to simultaneously decompose and remove nitrogen oxide and toxic chlorine compound such as dioxins.

Meanwhile, as illustrated in FIG. 3, a cement burning facility 21 comprises a preheater 22, a calciner 23, a cement kiln 24, a clinker cooler 25 and so on, and cement raw material R, which is fed to the preheater 22 from raw material supplying system, is preheated in the preheater 22, calcined in the calciner 23, burned in the cement kiln 24, and produced clinker is cooled in the clinker cooler 25. Here, the combustion exhaust gas from the cement kiln 24 was processed through desulferization in the preheater 22 and dust collection using an electric precipitator 26 since limestone as a main raw material has a property to adsorb SOx, and processed combustion exhaust gas was discharged in the atmosphere through a fan 27 and a stack 28.

Patent document 1: Japanese Patent Publication 2001-272023 gazette
Patent document 2: Japanese Patent Publication 2003-117343 gazette
Patent document 3: Japanese Patent Publication 2000-185217 gazette
Patent document 4: Japanese Patent Publication 2003-24746 gazette
Patent document 5: Japanese Patent Publication Heisei 7-75720 gazette

DISCLOSURE OF THE INVENTION

Problems to be Solved by the Invention

As described above, for incinerators for city garbage etc., varieties of technologies are proposed to remove harmful substances such as dioxins. But, using adsorbers such as activated carbon, the activated carbon with adsorbed dioxins is discharged as a waste, which causes a problem that the used activated carbon should be disposed. In addition, in such incinerators for city garbage or the like, denitration agent is used to reduce NOx, but, when the amount of the denitration agent is large, running cost of the incinerators is sky-rocketed.

In recent years, in response to a request of utilizing recycling resources, to the cement burning facility 21 shown in FIG. 3, a variety of utilizing recycling resources is supplied to a raw material system, from now on, if the amount of recycling resources supplied has been increasing, it is concerned that the amount of harmful substances discharged in the same manner as the incinerators for city garbage or the like, and running cost of the cement burning facility 21 have been increasing. Especially, since the quantity of combustion exhaust gas generated in the cement burning facility 1 is large, when the quantity of harmful substances contained in the combustion exhaust gas is small, a facility to remove such harmful substances becomes large, it may cause considerable increase in facility cost and running cost thereof.

The present invention has been made in consideration of the above problems, and the object thereof is to provide a device and a method for processing combustion exhaust gas that is applicable to incinerators for city garbage and cement kilns and so on to resolve the problems.

Means for Solving Problems

To achieve the above object, the present invention is characterized to have a dust collector collecting dust in combustion exhaust gas, a wet dust collector collecting water soluble components and dust in the combustion exhaust gas passed through the dust collector, and a catalyst tower decomposing and removing NOx and/or dioxins in the combustion exhaust gas passed through the wet dust collector.

With the present invention, the water soluble components and the dust in the combustion exhaust gas passed through the dust collector are collected by the wet dust collector, and dust, sulfuric acid mist, hydrogen chloride (HCl), mercury (Hg) and the like, which have serious influence to the life of the catalyst tower at the rear stage, are removed, and then, NOx and dioxins can be decomposed at the catalyst tower, which decreases the amount of denitration agent used in comparison to denitration method without catalyst in which denitration agent such as urea is fed to portions at high temperature of combustion device, and the quantity of adsorber or the like that is used to decompose NOx and dioxins and is required secondary deposition can be controlled to a minimum. In addition, an electric precipitator, a bag filter or the like as the dust collector can recycle useless dust without being wet dust.

In the above combustion exhaust gas processing device, at the front stage of the catalyst tower, a reheater heating the combustion exhaust gas discharged from the wet dust collector can be installed. With this reheater, the combustion exhaust gas at the inlet of the catalyst tower is to be increased to higher or equal to 170, which more effectively denitrates the gas and decomposes dioxins at the catalyst tower.

In the above combustion exhaust gas processing device, an oxidizer adding device may be installed to add an oxidizer to the combustion exhaust gas passed through the dust collector. With this construction, after oxidizing mercury and the like, the wet dust collector at the rear stage can adsorb the oxidized mercury in the combustion exhaust gas. As the oxidizer, hypochlorous acid soda and/or ozone or the like may be used. When ozone is used, since resolution velocity thereof is increased in alkali atmosphere, it is necessary to add chemicals to maintain the pH of circulating water below approximately 5 in acid atmosphere.

In the above combustion exhaust gas processing device, it is possible to install a solid/liquid separator separating slurry discharged from the wet dust collector into solid and liquid phases, and a mercury adsorbing tower adsorbing mercury in liquid separated in the solid/liquid separator. With this construction, mercury contained in the combustion exhaust gas is to be adsorbed to recover it.

In the above combustion exhaust gas processing device, at the rear stage of the catalyst tower, a heat recovering device may be installed to heat the gas supplied from the reheater with the combustion exhaust gas discharged from the catalyst tower. With this, it is possible to decrease the amount of auxiliary steam supplied to the reheater, resulting in reduced running cost.

In the above combustion exhaust gas processing device, a mixing scrubber can be used as the wet dust collector. Using the mixing scrubber or the like with high efficiency, dust, sulfuric acid mist, hydrogen chloride (HCl), mercury (Hg) and the like, which have serious influence to the life of the catalyst tower at the rear stage, may efficiently be removed.

In the aforementioned combustion exhaust gas processing device, the combustion exhaust gas may be exhausted from a cement kiln. With this, in the cement manufacturing facility where a variety of recycling resources are supplied to raw material system thereof, increase in discharge quantity of harmful substances and running cost is to be suppressed.

Further, the present invention is a combustion exhaust gas processing method characterized in that the method comprises the steps of: collecting dust in combustion exhaust gas; collecting water soluble components and dust in the combustion exhaust gas through wet process; and decomposing and removing NOx and/or dioxins in the combustion exhaust gas by using catalyst. With this method, as described above, using an economical facility, it is possible that the quantity of denitration agent can be reduced; the quantity of adsorber that requires secondary treatment to decompose NOx and dioxins may be controlled to a minimum; and so on.

Prior to decomposing and removing NOx and/or dioxins in the combustion exhaust gas by using catalyst, the combustion exhaust gas can be heated. With this method, it becomes possible to more effectively conduct the denitration and decompose dioxins in the catalyst tower.

It is possible to add an oxidizer to the combustion exhaust gas after the dust collection to oxidize mercury and the like, and then the oxidized mercury can be adsorbed in a wet dust collector at the rear stage. Here, as the oxidizer, hypochlorous acid soda and/or ozone and the like may be used.

Slurry generated by the wet dust collection may be separated into solid and liquid phases, and mercury in the liquid separated may be adsorbed and removed. In addition, residence time of the exhaust gas in the wet dust collector can be maintained more or equal to 1 second, and less or equal to 10 seconds to refrain the device from becoming too large. Furthermore, gas exhausted from a cement kiln may be processed as the combustion exhaust gas.

Effect of the Invention

As described above, with the present invention, increase in discharge amount of harmful substances and running cost can be suppressed.

THE BEST MODE TO CARRY OUT THE INVENTION

FIG. 1 shows an embodiment of the device and method for processing combustion exhaust gas according to the present invention, and in the below explanation, for an example, the device and method for processing combustion exhaust gas of the present invention is applied to the processing of combustion exhaust gas from a cement kiln of a cement burning facility.

As described in the column of background art, a cement burning facility 1 is provided with a preheater 2, a calciner 3, a cement kiln 4, a clinker cooler 5 and so on, and cement raw material R is fed to the preheater 2 from raw material supplying system not shown, and cement clinker Cl is produced through preheating at the preheater 2, calcining at the calciner 3, and burning at the cement kiln 4. The cement clinker Cl is quenched at the clinker cooler 5, and is ground in cement grinding process.

The combustion exhaust gas processing device comprises: an electric precipitator 6 in a rear stage of the cement burning facility 1; a wet dust collector 7 collecting water soluble compounds and dust in the combustion exhaust gas; a reheater 11; a catalyst tower 12 decomposing and removing NOx and the like; a heat recovering device 13; a solid/liquid separator separating slurry discharged from the wet dust collector 7 into solid and liquid phases; and a mercury adsorbing tower 17 adsorbing mercury in liquid separated in the solid/liquid separator 16.

The electric precipitator 6 is installed to collect dust in the combustion exhaust gas G from the preheater 2. In place of the electric precipitator 6, a bag filter may be used, and both of them may be disposed.

The wet dust collector 7 is installed to collect water soluble components and dust in the combustion exhaust gas G, and dust, sulfuric acid mist, hydrogen chloride (HCl) and mercury (Hg) and the like, which have serious influence to the life of the catalyst tower 12 at the rear stage, can be remove. As the wet dust collector 7, for example, a mixing scrubber (Mu scrubber manufactured by MU COMPANY LTD. etc.) may be used. The mixing scrubber is characterized in that plurality of guide vanes are installed to a cylindrical body to swirl flows of gas and liquid that move in the cylindrical body in opposite directions with each other or in the same direction to contact gas and liquid with each other for reaction between them, dust collection and so on. Preferably, the gas and the liquid flow in the same direction, and guide vanes giving right turning to the flows and those giving left turning to the flows are disposed in turn. In addition, in order to prevent the device from becoming too large, residence time of the combustion exhaust gas in the wet dust collector 7 is set to be between 1 second and 10 seconds.

Below the wet dust collector 7 is installed a circulating liquid tank 7a, and a pump 9 is disposed between the wet dust collector 7 and the circulating liquid tank 7a, which allows the slurry generated in the wet dust collector 7 to be circulated through the circulating liquid tank 7a and the pump 9.

The oxidizer adding device 10 is installed to add hypochlorous acid soda, ozone or the like as an oxidizer to oxidize mercury and the like contained in the combustion exhaust gas G.

The reheater 11 is mounted to heat the combustion exhaust gas G discharged from the mist separator 8. The heating of the combustion exhaust gas G is performed to conduct denitration and decomposition of dioxins more effectively at the catalyst tower. On the inlet side of the reheater 11 is fed ammonia ($NH_3$) that is used as reducing agent in the catalyst tower 12 at the rear stage. The reason why ammonia is added at the front stage of the catalyst tower 12 is to utilize mixing effect at a fan and the reheater 11, so that it can be added to a portion between the outlet of the wet dust collector 7 and the inlet of the catalyst tower 12 other than the inlet side of the reheater 11, where the mixing effect can be utilized.

The catalyst tower 12 is installed to decompose and remove NOx and dioxins in the combustion exhaust gas G passed through the electric precipitator 6. This catalyst tower 7 is constructed to shape a honeycomb, which allows the tower to relatively small even in case that a large amount of combustion exhaust gas is processed.

The heat recovering device 13 performs heat exchange between the combustion exhaust gas G discharged from the catalyst tower 12 and the gas from the reheater 11, and the heat recovered from the combustion exhaust gas G is utilized in the reheater 11. Meanwhile, when recovering heat from the combustion exhaust gas G discharged from the catalyst tower 12, in place of the heat recovering device 13 and the reheater 11, a heat pipe may be used, and heat is recovered at an evaporating portion of the pipe from the combustion exhaust gas G discharged from the catalyst tower 12, and the heat may radiate at a condensing portion of the pipe on the inlet side of the catalyst tower 12. Further, in place of the heat pipe, Ljungstrom (registered trademark)-type heat exchanger (manufactured by ALSTOM K.K.) may be used.

The solid/liquid separator 16 separates the slurry discharged from the wet dust collector 7 into solid and liquid phases, and a micro-filter or the like can be used.

The mercury adsorbing tower 17 is installed to adsorb mercury in the liquid separated by the solid/liquid separator 16, and the drainage processing facility 18 processes the liquid after mercury being adsorbed and discharge it into a river or the like. For water treatment conducted here, decomposition treatment by oxidization using ozone is though to be suitable. Meanwhile, it is possible to reuse a part of the drainage passed through the mercury adsorbing tower 17 in the wet dust collector 7. And, the drainage from the wet dust collector 7 can also be utilized, for instance, to cool the combustion exhaust gas W of the cement kiln 4

Next, the motion of the device for processing combustion exhaust gas with the above-mentioned construction will be explained while referring to FIG. 1.

The combustion exhaust gas G from the cement kiln 4, which is desulfurized at the preheater 2, is introduced to the electric precipitator 6, where dust in the combustion exhaust gas G is collected. The combustion exhaust gas passed through the electric precipitator 6 is fed to the wet dust collector 7, where water soluble components and dust in the combustion exhaust gas G are collected to remove dust, sulfuric acid mist, hydrogen chloride (HCl), mercury (Hg) and the like that have serious influence to the life of the catalyst tower at the rear stage.

Slurry generated at the wet dust collector 7 circulates through the circulating liquid tank 7a and the pump 9, so that contact of the combustion exhaust gas W and the liquid is sufficiently performed, which efficiently performs the oxidization of mercury and the like using hypochlorous acid soda and the like supplied from the oxidizer adding device 10, and the collections of water soluble components and dust. In this connection, at the wet dust collector 7, water is circulated and a portion thereof is drawn to supply it to the solid/liquid separator 16. This circulating water is discharged to the extent that refugacity of the water-soluble components does not cause a problem.

The combustion exhaust gas C of which water soluble components, dust and the like are removed is introduced from the mist separator 8 to the reheater 11 and is heated there. The reason why the combustion exhaust gas G is heated is that the denitration and the decomposition of dioxins are preferably carried out at 170 to 500, in consideration of the decomposition performance and life of the catalyst, 230 to 270.

As described above, in the wet dust collector 7, dust, sulfuric acid mist, hydrogen chloride (HCl) and mercury (Hg) and the like, which have serious influence to the life of the catalyst tower 12 at the rear stage, are removed. As illustrated in FIG. 2, a mixing scrubber (in this test, as an example, Mu scrubber manufactured by MU COMPANY LTD was used) is used to maintain the life of the catalyst of the catalyst tower 12 and prevent the reduction of denitirification ratio in comparison to conventional horizontal-type scrubbers.

As heat source of the reheater 11, the combustion exhaust gas G discharged from the catalyst tower 12 is used. The combustion exhaust gas G discharged from the catalyst tower 12 is heat-exchanged at the heat recovering device 13 with the gas fed from the reheater 11, and recovered heat is utilized in the reheater 11. Since only the heat recovered at the heat recovering device 13 cannot cover the calorie consumed in the reheater 11, auxiliary steam S is introduced to the reheater 11. In addition, on the inlet side of the reheater 11 is introduced ammonia ($NH_3$) as denitration agent used in the catalyst tower 12. As stated above, ammonia can be added to the place between the outlet of the wet dust collector 7 and the inlet of the catalyst tower 12 other than the inlet side of the reheater 11 where mixing effect can be utilized.

Next, the combustion exhaust gas G is fed to the catalyst tower 12, where NOx and dioxins are decomposed. As mentioned above, the temperature in the catalyst tower 12 is controlled to be between 170 and 500, which is suitable for denitirification of the combustion exhaust gas G and decomposition of dioxins, preferably between 230 and 270. Here, since the heat recovering device 13 is installed in the rear stage of the catalyst tower 12, the temperature in the catalyst tower 12 can be maintained highly, and increasing the driving temperature of the catalyst tower 12 as high as possible causes the efficiency of the catalyst tower 12 to be increased, resulting in reduced amount of catalyst used.

The combustion exhaust gas G from the catalyst tower 12 is discharged to the atmosphere through the heat recovering device 13, the fan 14 and the stuck 15. The temperature of the combustion exhaust gas G at the outlet of the fan 14 is controlled at about 110. As a result, energy consumed to heat the combustion exhaust gas G in the reheater 11 is only the increase in lost energy.

On the other hand, the slurry discharged from the circulating liquid tank 7a is divided into solid and liquid phases by the solid/liquid separator 16, and mercury in the liquid separated is dissolved into water as chlorocomplex ion ($HgCl_4^{2-}$), and this is adsorbed by the mercury adsorbing tower 17 and is processed out of the system. The liquid of which mercury is removed is processed by the drainage processing facility 18, and the resultant is reused in the wet dust collector 7, and is used to cool the combustion exhaust gas G of the cement kiln 4

EXPLANATION OF SIGNALS

Figure 1:
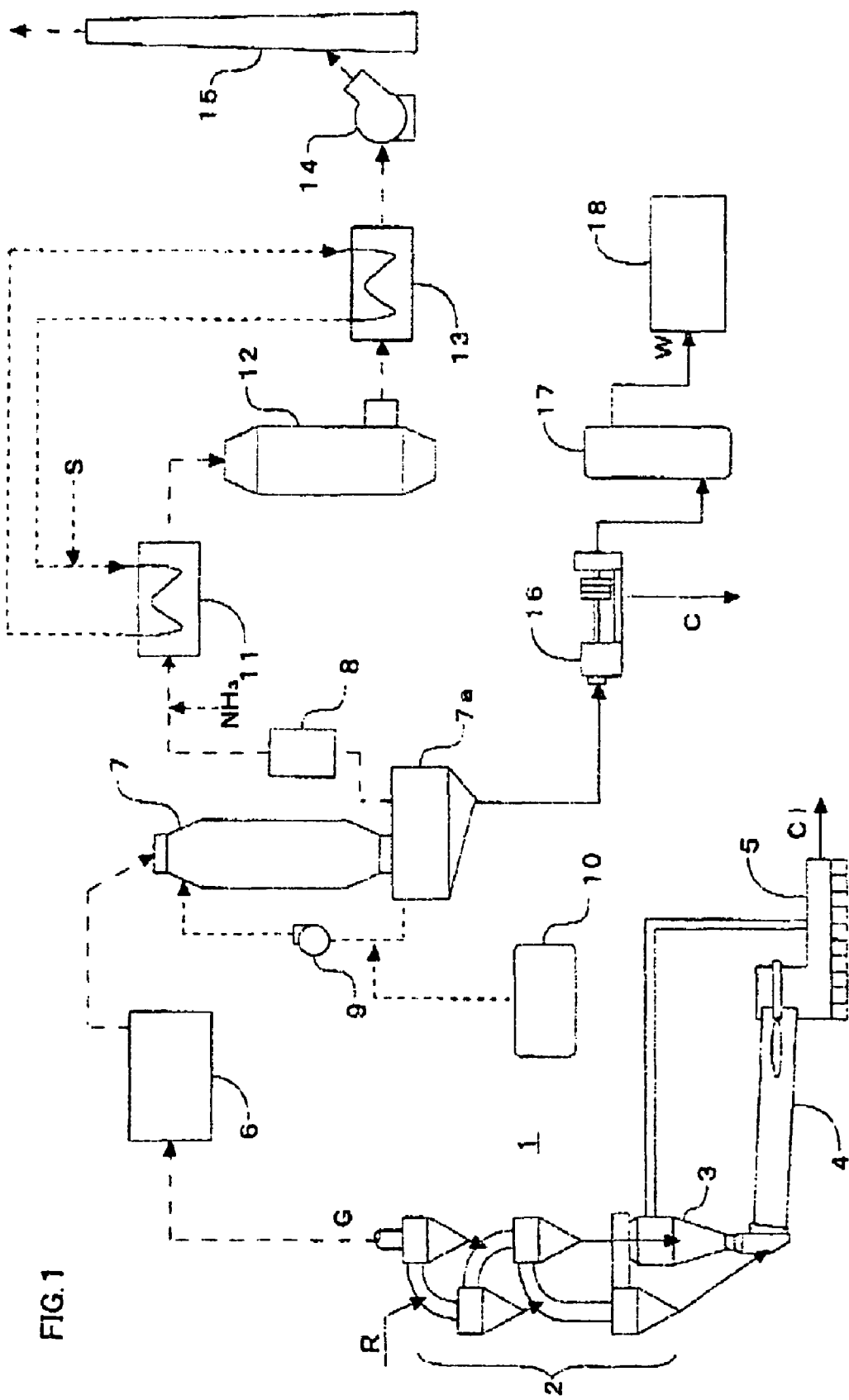
FIG. 1 A flowchart showing an embodiment of the device and the method for processing combustion exhaust gas according to the present invention FIG. 2 A graph showing the relationship between the kinds of wet dust collectors of the combustion exhaust gas processing device according to the present invention and the denitirification ratio at the denitirification tower FIG. 3 A flowchart showing an example of a conventional cement burning facility
Figure 2:
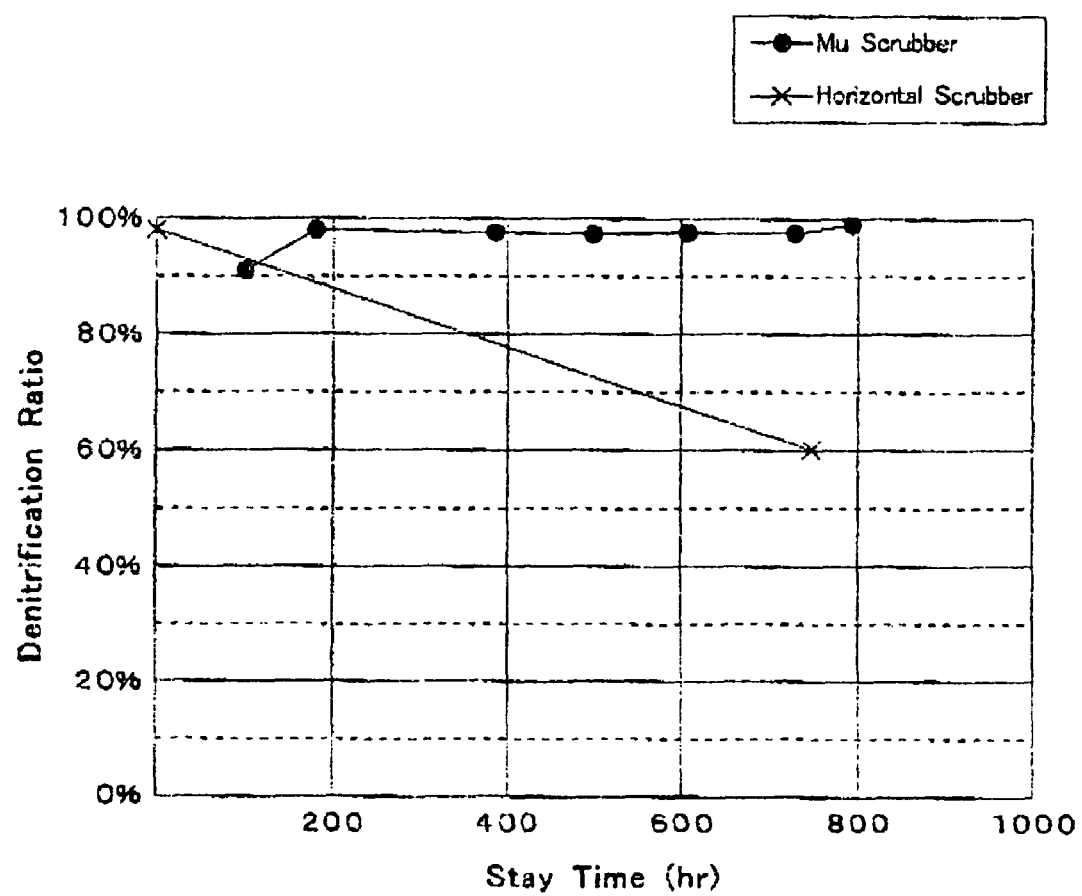
Figure 3:
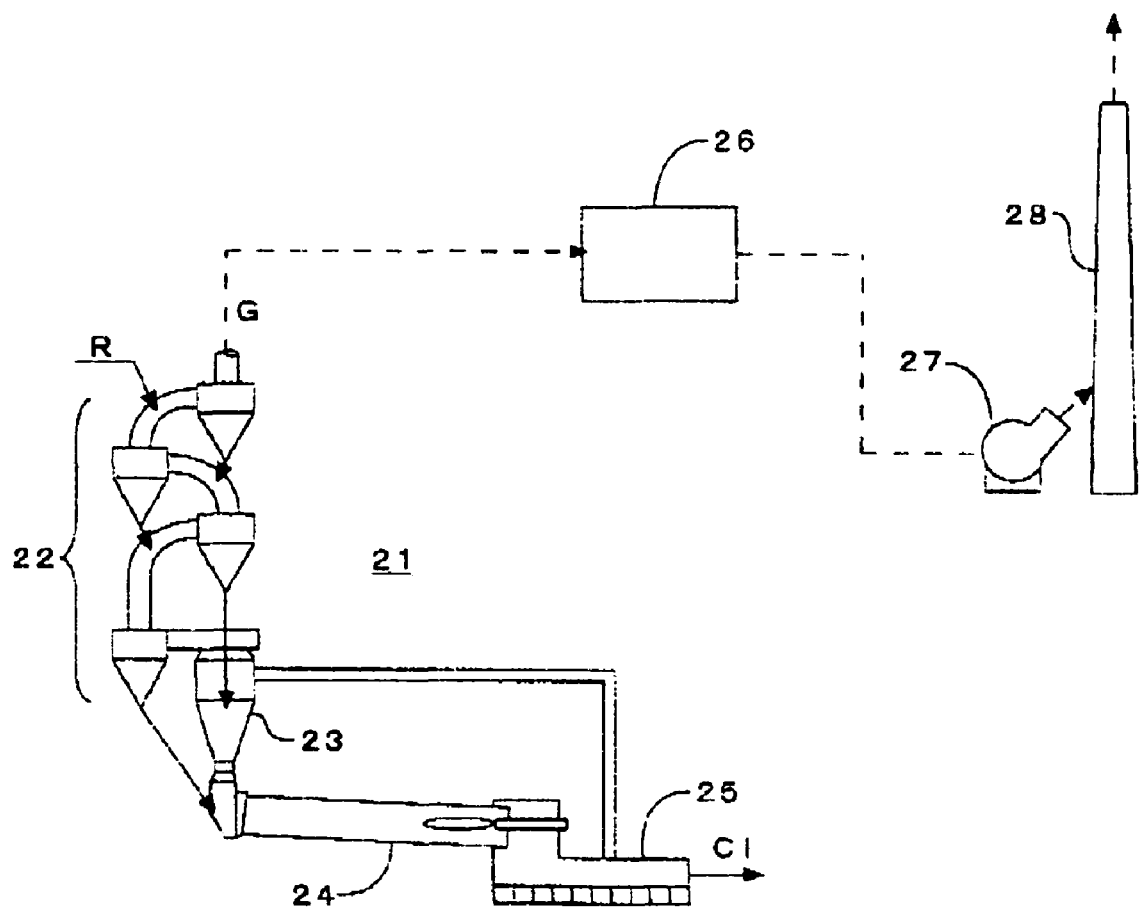

1 cement burning facility
2 preheater
3 calciner
4 cement kiln
5 clinker cooler
6 electric precipitator
7 wet dust collector
7a circulating liquid tank
8 mist separator
9 pump
11 reheater
12 catalyst tower
13 heat recovering device
14 fan
15 stuck
16 solid/liquid separator
17 mercury adsorbing tower
18 drainage processing facility

The invention claimed is:

1. A combustion exhaust gas processing device comprising:
   a dust collector collecting dust in combustion exhaust gas;
   a wet dust collector collecting water soluble components and dust in the combustion exhaust gas passed through the dust collector; and
   a catalyst tower decomposing and removing NOx and/or dioxins in the combustion exhaust gas passed through the wet dust collector;
   wherein the combustion exhaust gas is exhausted from a cement kiln.

2. The combustion exhaust gas processing device as claimed in claim 1, further comprising a reheater heating the combustion exhaust gas discharged from the wet dust collector at a front stage of the catalyst tower.

3. The combustion exhaust gas processing device as claimed in claims 1 or 2, further comprising an oxidizer adding device adding an oxidizer to the combustion exhaust gas passed through the dust collector.

4. The combustion exhaust gas processing device as claimed in claim 3 wherein said oxidizer includes hypochlorous acid soda and/or ozone.

5. The combustion exhaust gas processing device as claimed in claims 1 or 2 further comprising a solid/liquid separator separating slurry discharged from the wet dust collector into solid and liquid phases, and a mercury absorbing tower absorbing mercury in liquid separated in the solid/liquid separator.

6. The combustion exhaust gas processing device as claimed in claims 1 or 2 further comprising a heat recovering device, at a rear stage of the catalyst tower, heating gas supplied from the reheater with the combustion exhaust gas discharged from the catalyst tower.

7. The combustion exhaust gas processing device as claimed in claims 1 or 2 wherein said wet dust collector is a mixing scrubber.

8. A method of processing a combustion gas comprising the steps of:
   collecting dust in combustion exhaust gas;
   collecting water soluble components and dust in the combustion exhaust gas through wet process; and
   decomposing and removing NOx and/or dioxins in the combustion exhaust gas after said wet dust collection by using catalyst;
   wherein the combustion exhaust gas is exhausted from a cement kiln.

9. The method of processing a combustion exhaust gas as claimed in claim 8, further comprising the step of heating the combustion exhaust gas before decomposing and removing NOx and/or dioxins in the combustion exhaust gas by using catalyst.

10. The method of processing a combustion exhaust gas as claimed in claims 8 or 9, further comprising the step of adding an oxidizer to the combustion exhaust gas after the dust collection.

11. The method of processing a combustion exhaust gas as claimed in claim 10 wherein said oxidizer includes hypochlorous acid soda and/or ozone.

12. The method of processing a combustion exhaust gas as claimed in claims 8 or 9 further comprising the step of solid/liquid separating the slurry generated by the wet dust collection, and adsorbing mercury in liquid separated in the solid/liquid separation.

13. The method of processing a combustion exhaust gas as claimed in one of claims 8 or 9 wherein residence time of said exhaust gas in the wet dust collector is more or equal to 1 second and less or equal to 10 seconds.

* * * * *